United States Patent
Taylor, III et al.

(10) Patent No.: US 6,813,621 B1
(45) Date of Patent: Nov. 2, 2004

(54) PROCESSING GRAPHIC IMAGES HAVING VARIOUS FILE FORMATS

(75) Inventors: Robert B. Taylor, III, Washougal, WA (US); Kevin Bier, Brush Prairie, WA (US); Robert C. Borcic, Escondido, CA (US); Jan E. Idomir, Ridgefield, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 719 days.

(21) Appl. No.: 09/373,499

(22) Filed: Aug. 12, 1999

(51) Int. Cl.[7] .............................................. G06F 17/30
(52) U.S. Cl. ...................... 707/102; 707/1; 707/104.1; 358/451; 345/418
(58) Field of Search ............... 707/1–5, 10, 100–104.1, 707/200, 203, 205, 500–501.1, 522–524, 530–531, 901; 709/219, 223, 246, 328–331; 358/403, 408, 451; 345/810, 698, 866, 835, 418

(56) References Cited

U.S. PATENT DOCUMENTS

| | | | | |
|---|---|---|---|---|
| 5,299,304 A | * | 3/1994 | Williams et al. ............. | 707/523 |
| 5,608,874 A | * | 3/1997 | Ogawa et al. ............... | 709/246 |
| 5,731,813 A | * | 3/1998 | O'Rourke et al. ........... | 345/810 |
| 5,745,907 A | * | 4/1998 | Yamamoto .................... | 707/502 |
| 5,767,833 A | * | 6/1998 | Vanderwiele et al. ........ | 345/698 |
| 5,983,229 A | * | 11/1999 | Houchin et al. ............. | 707/100 |
| 6,061,695 A | * | 5/2000 | Slivka et al. ................ | 707/513 |
| 6,061,696 A | * | 5/2000 | Lee et al. .................... | 707/513 |
| 6,154,208 A | * | 11/2000 | Otala .......................... | 345/335 |
| 6,167,404 A | * | 12/2000 | Morcos et al. ............... | 707/102 |
| 6,247,011 B1 | * | 6/2001 | Jecha et al. ..................... | 707/9 |
| 6,266,678 B1 | * | 7/2001 | McDevitt et al. ............ | 707/201 |

FOREIGN PATENT DOCUMENTS

| EP | 0676069 B1 | * | 3/1998 | ..................... 17/22 |
|---|---|---|---|---|
| WO | WO 97/08652 | * | 3/1997 | |
| WO | WO 99/27470 | * | 6/1999 | ..................... 17/30 |

* cited by examiner

Primary Examiner—Srirama Channavajjala

(57) ABSTRACT

A system and method for use in a computer system is provided to read and write graphical images by an application program by using a format independent interface with an image format specific modules to process application commands to read or write graphical images, allowing the application to read and write graphical image data in various file formats.

46 Claims, 5 Drawing Sheets

PROCESSING GRAPHIC IMAGES HAVING VARIOUS FILE FORMATS

FIELD OF THE INVENTION

This invention relates to computer systems, and in particular to accessing graphic images stored in plural formats.

BACKGROUND

Personal computers are now commonly used to read, write and process computer files with graphic images. Various application programs, for example, word-processing, spreadsheet, and database programs extensively use graphic images stored in various file formats. Some common file formats used to store graphics images are JPEG, BMP and TIFF. Typically the extension of a computer file denotes the format in which the file is stored, for example, a computer file called "Myfile.TIFF" is stored in a TIFF format.

Conventionally, application programs need individual filters corresponding to specific file formats for viewing and processing graphic images. Hence applications can only read specific file formats for which the application has a filter. Furthermore, in some instances application programs are not able to read new file formats because the application programs may only have format specific filters that cannot process new file formats.

Hence, what is needed is a format independent interface that allows an application program to read various file formats, and also update the interface to handle new file formats allowing application programs to process new file formats.

SUMMARY

The present invention addresses the foregoing by providing a system and method that allows an application program to read and save graphics image data in a file format without using any format specific filters. A format independent interface (FII) is provided, wherein the FII communicates with an application program and routes image data and application program commands. FII can interface with a plurality of image format handling (IFH) modules, wherein each module can process format specific graphical image data. The application program sends a read request to read a graphics image saved in a specific format to the FII, and the FII routes the request to the IFH module that can open the requested file, and the IFH module converts the file from the specific file format to a device independent bitmap (DIB) data. Thereafter, the IFH module sends the DIB data to FII, and further to a graphical device interface for displaying, or for printing.

In another aspect of the present invention, an application program provides to the FII DIB image data with a command to save the DIB data in a specific file format. Thereafter, the FII sends the DIB image data to an IFH module that can process the specified format. The IFH module converts the DIB image data to the specified format and saves the file in the specified format.

In yet another aspect of the present invention, a IFH module for a new format is created and added to a registry that maintains a list of file formats that can be processed by FII.

By virtue of the foregoing aspects of the present invention, an application program does not require any specific file filters. Furthermore, an application program can support new file formats as long as an IFH module embodying the new file format is created and installed.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

Figure 1:
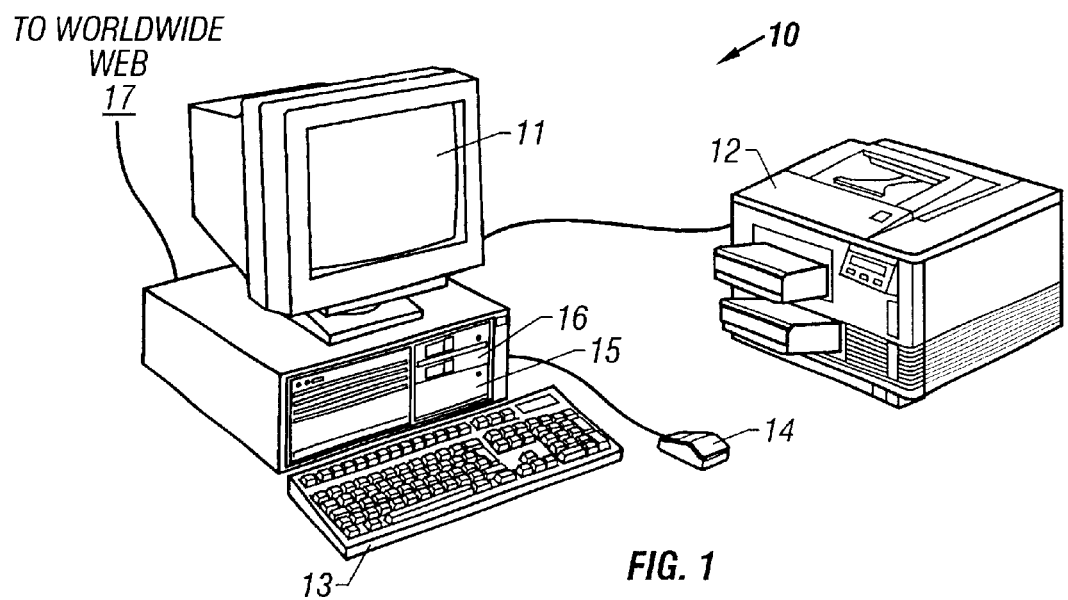
FIG. 1 illustrates a computing system to carry out the inventive technique.

FIG. 1 is a block diagram of a computing system, which includes a host computer 10, a monitor 11, and a printer 12. Monitor 11 may be a CRT type, a LCD type, or any other type of color or monochrome display. Printer 12 may be any type of printer such as an inkjet printer, laser printer, thermal printer, dot matrix, or the like. Also provided with computer 10 is a keyboard 13 for entering text data and user commands, and a pointing device 14 for processing objects displayed on monitor 11.

Computer 10 includes a computer-readable memory medium such as a rotating disk 15 for storing readable data. Besides other programs, disk 15 stores application programs by which computer 10 generates, manipulates and stores files on disk 15, displays data in those files on monitor 11, and prints data in those files via printer 12.

Device drivers are also stored on disk 15. One of the stored device drivers is a printer driver that provides a software interface to firmware in printer 12, thereby facilitating data transfer between computer 10 and printer 12.

Computer 10 can also access a computer-readable floppy disk storing data files, application program files, and computer executable process steps embodying the present invention or the like via a floppy disk drive 16. A CD-ROM interface (not shown) may also be provided with computer 10 to access application program files, device driver files, data files and computer executable code embodying the present invention.

A modem, an integrated services digital network (ISDN) connection, or the like also provides computer 10 with an Internet connection 17 to the World Wide Web (WWW). The Internet connection 17 allows computer 10 to download data files, image files, application program files, and computer-executable process steps embodying the present invention.

Figure 2:
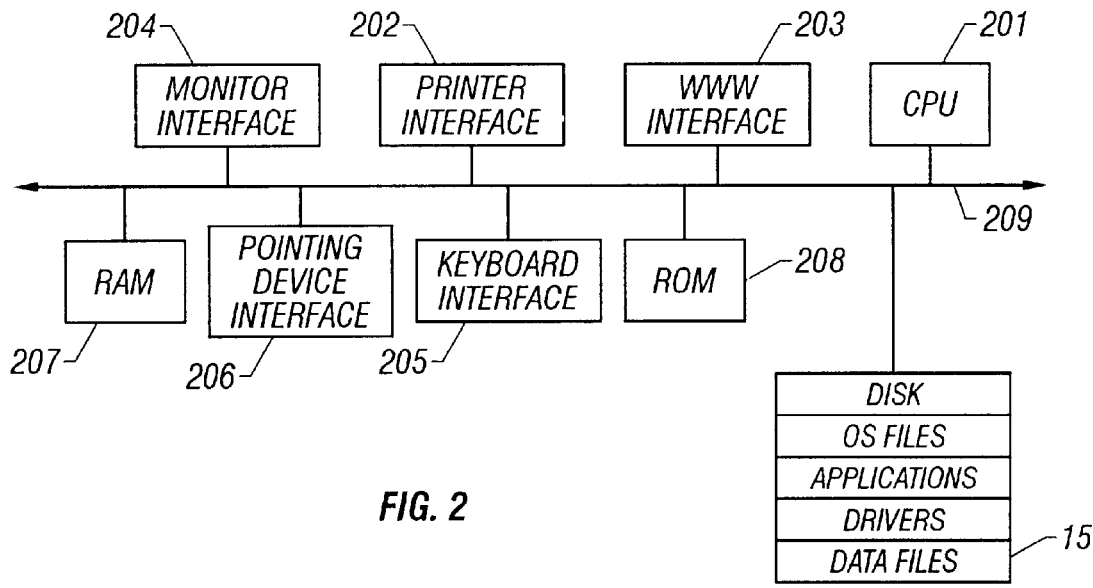
FIG. 2 is a block diagram of the architecture of the computing system of FIG. 1.

FIG. 2 is a block diagram showing the internal functional architecture of computer 10. As shown in FIG. 2, computer 10 includes a CPU 201 for executing computer-executable process steps and interfaces with a computer bus 209. Also shown in FIG. 2 are a printer interface 202, a WWW interface 203, a display device interface 204, a keyboard interface 205, a pointing device interface 206 and disk 15.

As described above, disk 15 stores operating system program files, application program files, image files, data files and device drivers such as a printer driver for printer 12. Some of these files are stored on disk 15 using an installation program. For example, CPU 201 executes computer-executable process steps of an installation program so that CPU 201 can properly execute the application program.

A random access main memory ("RAM") 207 also interfaces to computer bus 209 to provide CPU 201 with access to memory storage. When executing stored computer-executable process steps from disk 15 (or other storage media such as floppy disk 16 or from the files downloaded via the WWW connection 17), CPU 201 stores those process steps in RAM 207 and executes the stored process steps out of RAM 207.

Read only memory ("ROM") 208 is provided to store invariant instruction sequences such as start-up instruction sequences or basic Input/output operating system (BIOS) sequences for operation of keyboard 13.

Most windowing application programs, like Microsoft Word have a function that allows a user to read or write an image file and print a particular image file. Depending upon the application, a user can issue a command using keyboard 13 and/or pointing device 14 to open and/or save an image file.

Figure 3:
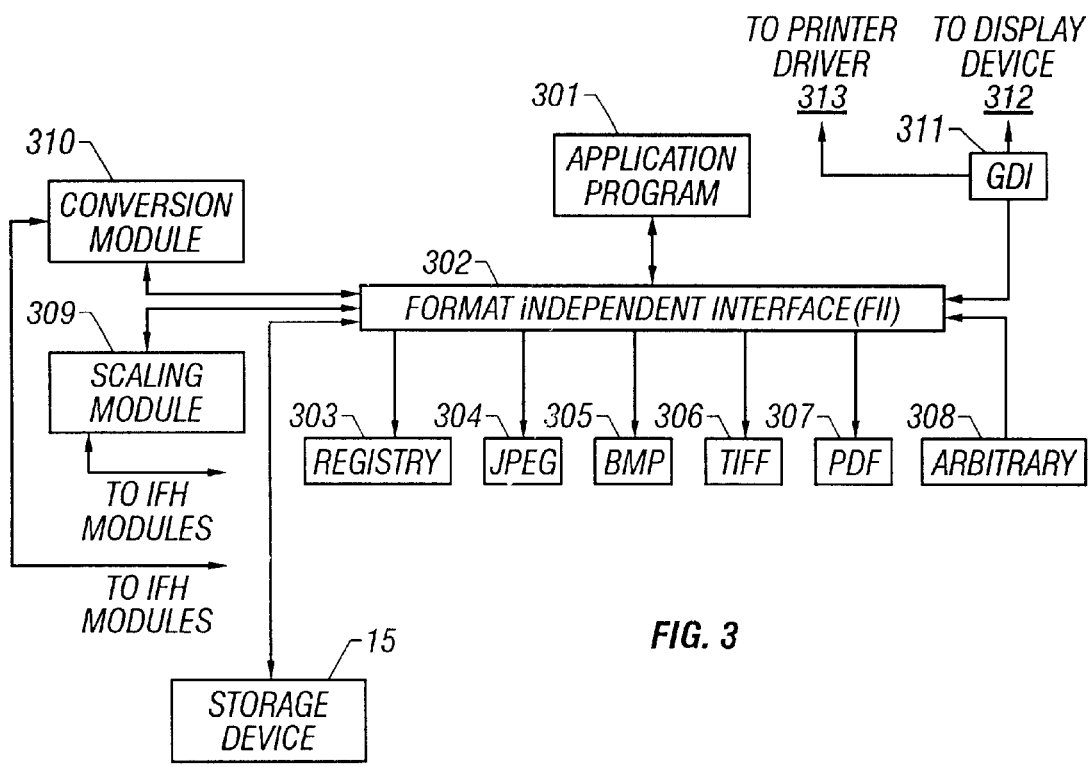
FIG. 3 is a block diagram of an architecture to carry out the inventive technique.

FIG. 3 is a block diagram of the system according to the present invention. Application program 301 is a computer program that can manipulate graphic images and can communicate to a Format Independent Interface ("FII") 302, as described below. FII 302 communicates with a plurality of IFH modules for processing computer file data stored in various formats, for example, a JPEG module 304 for processing JPEG data, a BMP module 305 for processing BMP data, a TIFF module 306 for processing TIFF data, a PDF module 307 for processing PDF data and an arbitrary image format module 308 for processing data in any other file formats. Also shown in FIG. 3 is a Windows Registry 303 provided by a Windows Operating System that maintains a log for all the supported file formats.

Also shown in FIG. 3 are a Scaling module 309 and a Conversion module 310 connected to the plurality of IFH modules and FII 302 for scaling and changing graphics image bit depth respectively. FIG. 3 also shows a graphical device interface ("GDI") 311 that receives commands from FII 302 and sends data to a display device 312, for example, monitor 11, or routes data to a printer driver 313.

For illustration purposes, FIG. 3 architecture can be based upon component object model (COM), a standard for software component interoperability that is platform and programming language independent, defined by Microsoft Corporation. COM defines a binary standard for function calling between software components and also provides a base interface for components to discover and utilize interfaces implemented by other components. In FIG. 3, FII 302 can be a COM interfaces, while JPEG module 304, BMP module 305, TIFF module 306, PDF module 307, Arbitrary image format module 308, Scaling module 309 and Conversion module 310 can be COM objects. It is noteworthy that the present invention is not limited to a COM implementation, other implementations, for example,CORBA from the Object Management Group (Http://www.OMG.Org) may also be used.

Figure 4:
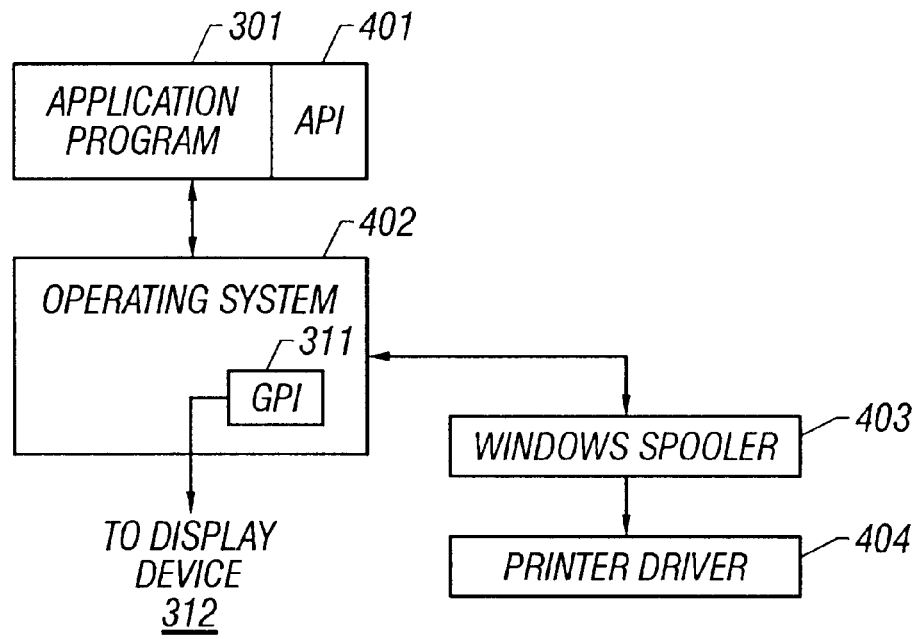
FIG. 4 is a block diagram of a top level architecture to carry out the inventive technique.

FIG. 4 is a block diagram showing application program 301 with application programming interface ("API") 401 connected to Operating System 402. Also shown in FIG. 4 is a Windows Spooler 403 that sends print data to a printer driver 404. The Operating System 402 for the present invention is Windows based.

Figure 5:
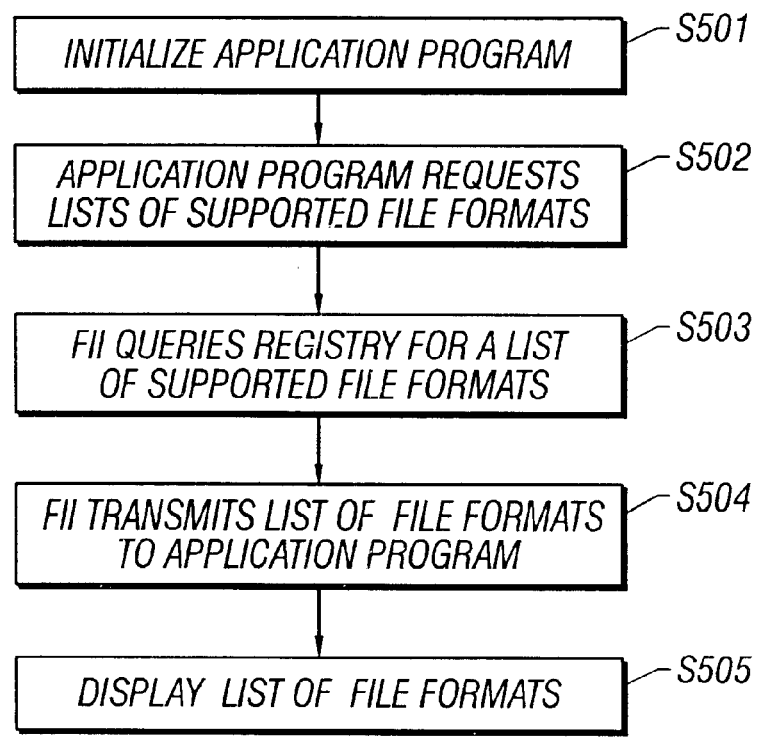
FIG. 5 is a basic flow chart showing computer executable process steps according to one aspect of the present invention, for transmitting a list of file formats to an application program.

FIG. 5 is a flow diagram of computer executable process steps according to one aspect of the present invention, to provide a list of file formats to application program 301 from FII 302. Preferably, the computer executable process steps are loaded into RAM 207 and executed by CPU 201.

More particularly, flow begins at step S501, in which application program 301 is initialized either by keyboard 13 or by pointing device 14.

In step S502, application program 301 requests FII 302 for a list of all file formats supported by FII 302.

In step S503, FII 302 queries Windows Registry 303 for a list of supported file formats, and Windows Registry 303 provides a list of all supported file formats to FII 302. Register 303 provides a list of file extensions, for example, .JPG, .TIFF, .BMP and .PDF which signifies that FII 302 supports JPEG, TIFF, BMP and PDF file formats respectively.

In step S504, FII 302 transmits the list of file extensions to application program 301.

In step S505, application program 301 displays the list of file extensions to a user who can then select a plurality of file formats.

Figure 6:
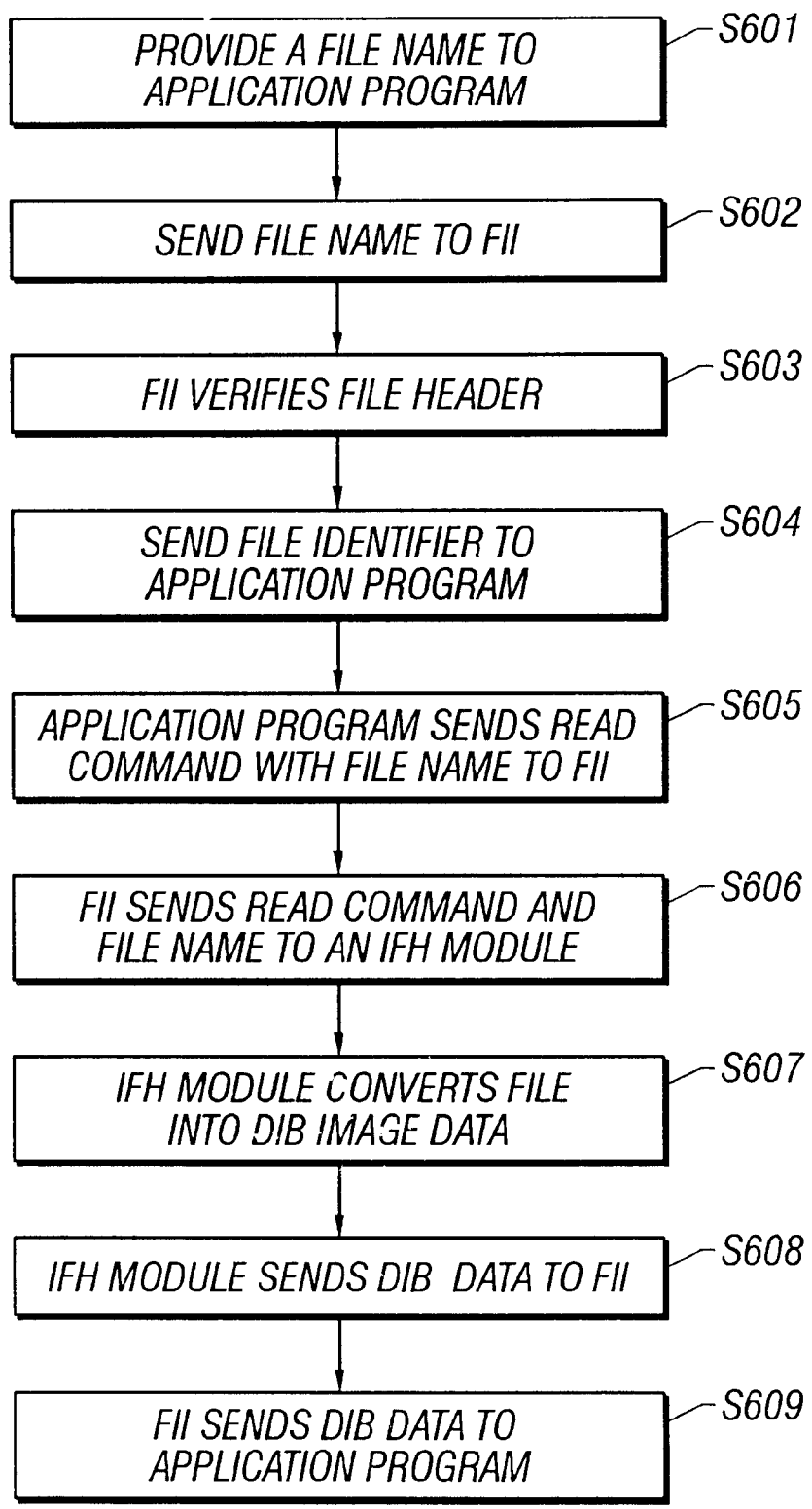
FIG. 6 is a basic flow chart showing computer executable process steps according to one aspect of the present invention, for reading format specific image files.

FIG. 6 is a flow diagram of computer executable process steps according to another aspect of the present invention, to read graphic images of arbitrary formats. Preferably, the computer executable process steps are loaded into RAM 207 and executed by CPU 201.

More particularly, in step S601, a user provides a file name and address of a computer file containing graphic image data to application program 301. The file name indicates the format of the graphics image, for example, "Myfile.JPG" is a JPEG file.

In step S602, application program 301 sends the file name and address to FII 302.

In step S603, FII 302 opens the file and verifies the file header. The specified file may be stored on disk 15, a floppy disk in floppy disk drive 16, or stored at a remote site.

In step S604, FII 302 sends a file identifier to application program 301.

In step S605, application program 301 sends the read command to FII 302 to read the file whose name is provided in step S601.

In step S606, FII 302 sends the read command to an IFH module that can process the read command. For example, if the request is to read a JPEG file, the read command FII 302 sends the read command to JPEG module 304.

In step S 607, the IFH module opens the file whose name is provided in step S606, and converts the file from a specific file format to a device independent bitmap ("DIB") format. For example, if the file is in JPEG format, JPEG module 304 opens the JPEG file and converts the JPEG data into a DIB format.

If the request also includes scaling a particular image prior to reading, then FII 302 or the relevant IFH module (JPEG module 304 in the above example) commands Scaling module 310 to scale the image. FII 302 and the relevant IFH module can also command Conversion module 311 to change the bit depth of a particular image.

In step S608, the IFH module that processes the read command sends the converted DIB image data to FII 302. In the above example JPEG module 304 sends DIB image data to FII 302.

In step S609, FII 302 sends the DIB image data to application program 301. If the image is to be displayed, FII 302 sends image data to GDI 312 which in turn sends the image data to display device 313. If the image is to be printed, GDI 313 sends image data to printer driver 314.

Figure 7:
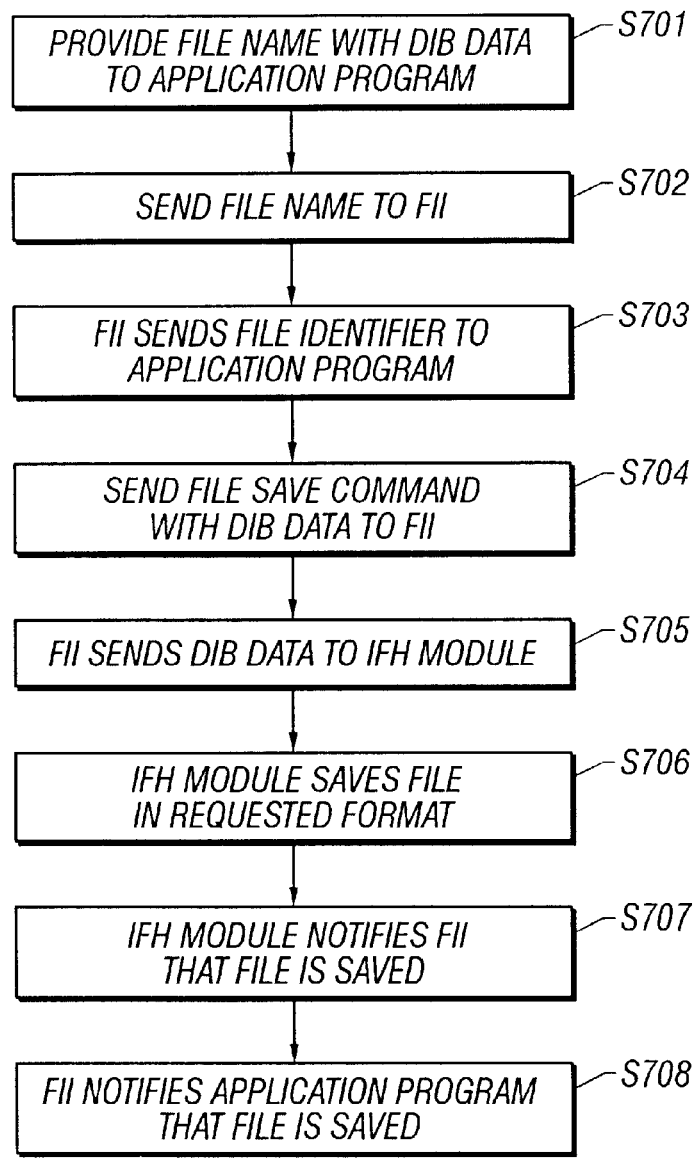
FIG. 7 is a detailed flow diagram showing computer executable process steps according to one aspect of the present invention for storing image files in a specific format.

FIG. 7 is a flow diagram of computer executable process steps to save graphic images in a particular format, according to yet another aspect of the present invention. Preferably, the computer executable process steps are loaded into RAM 207 and executed by CPU 201.

More particularly, in step S701, provide a file name, address and save command with graphics DIB image representing the file data, to Application program 301. The file name indicates the format for storing the file, for example, "Myfile.JPG" is a JPEG file.

In step S702, application program 301 sends the file name and address to FII 302.

In step S703, FII 302 sends a file identifier to application program 301 confirming that a module to save the file in the requested format is available.

In step S704, application program 301 sends a save command to FII 302 with the file DIB image data.

In step S705, FII 302 sends the DIB image data to a the specific module that can process the DIB image data, and save the DIB image data in a particular format. For example if the request is to save a file in the JPEG format, FII 302 sends the save command with the DIB image data to JPEG module 304.

In step S706, the format specific IFH module saves the DIB image data to a user requested format by converting the DIB image data to the requested file format. As discussed, if the request is to save an image file as a JPEG file, JPEG module 304 converts incoming DIB image data to JPEG data and saves the DIB image data as a JPEG file.

In step S707, the particular IFH module that saves the file in a specific format notifies FII 302 that the DIB data is saved in a specific format.

In step S708, FII 302 informs application program 301 that image file data is stored in the requested format.

Figure 8:
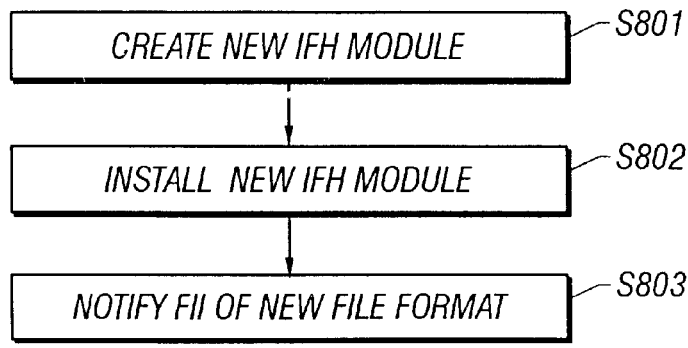
FIG. 8 is a detailed flow diagram showing computer executable process steps to add new file formats that can supported by a format independent interface.

FIG. 8 is a flow diagram of computer executable process steps according to another aspect of the present invention, to add new formats that can be supported by FII 302. Preferably, the computer executable process steps are loaded into RAM 207 and executed by CPU 201.

In step S801, create a new IFH module that can process data in the new file format.

In step S802, install the new IFH module by adding an entry to Windows Registry 303 that identifies the file extension for the new file format.

In step S803, notify FII 302 of the new file format extension.

Hence Format specific modules can be added to support new file formats and as discussed above Application program 301 can utilize a plurality of file formats without having any format specific filters.

Appendix "A" provides list of function tags for FII 302 and IFH modules to implement the foregoing aspects of the present invention. Also provided in appendix "A" is a sample computer executable code for image format conversion, according to one aspect of the present invention. One skilled in the art of computer programming can practice the foregoing aspects of the present invention by using the function tags and sample code disclosed in Appendix "A".

Although the present invention has been described with reference to specific embodiments, these embodiments are illustrative only and not limiting. Many other applications and embodiments of the present invention will be apparent in light of this disclosure and the following claims.

APPENDIX A

IFH functionTags:
For illustration purposes, the following are exemplary function tags relating to IFH modules, for carrying out computer executable process steps shown in FIG. 5, 6 and 7:
Iformat Handler: Function tag for executing IFH 303 operations as described by the following commands:
  GetPaletteHere (pPalette, dwPaletteBytes, pdwBytesNeeded):
Allows for retrieval of an image's palette and/or the size of the palette.
  GetOptimizedPaletteHere (pPalette, dwPaletteEntries: Allows for retrieval of an optimized palette for the given number of palette entries.
  SetPalette (pPalette, dwPaletteEntries): Allows the client to assert a different palette from default.
  GetBitmapInfoHere (pFormatInfo DWORD dwStructSize,DWORD *pdwBytesNeeded): Allows for retrieval of image format information structure and/or the size of the structure.
  SetFilename(filename): This function is used to associate FII 302 with an image file.
GetFilename(ptszFilename): This function is used to retrieve the name of a file.
SetData(hGlobal, fOptions): This function is used to associate FII 302 with an in-memory image.
  SaveFile(filename, quality): This function is used to write image data to a file in a native format.
  StartSave(filename, pFormatInfo, pSourceIFH, quality): This function is used to start writing the image data to a file in a native format.
  StartSave(filename, pFormatInfo, hGlobal;quailty): This function is used to start writing the image data to a file in a native format.
  SaveStrip(dwSizeHint, pdwBytesWritten): This function writes some of image data to disk 15.
  QueryGetDataRegion (pFormatInfo, fOptions): This function is called to determine whether a DIB image can be created for a specified format and resolution.
  QueryGetDataRegion (pFormatInfo, fOptions): Returns image data in the required DIB format and resolution.
  GetDataRegionHere(pFormatInfo, pClipRegion, dwDataSize, pdwBytesNeeded, pMedium, fOptions): Returns image data in the required DIB format and resolution.
  GetNativeHere(pSTM, dwIndex, dwByteCount, pdwNumBytes): This function is used to access image data in it's native format. It can also be used to determine the size of the native data stream.
  GetFormatType(pGUIDFormatType): This function is used to query standardized format type.
  SwitchFile(path): This function is used to force FII 302 to continue operation with a different file.
  GetFrameCount(pdwNumFrames): This function is used to query for the number of frames or sub-images that an image file contains.
  SelectFrame(dwFrame): This function is used to select the frame that IFH module should operate on.
  FII 302 function Tags:

For illustration purposes, the following are exemplary function tags related to FII 302, for carrying out computer executable process steps shown in FIG. 5 and 6 and 7:
    ISS-EnumIFHs: uses Registry 309 to enumerate IFH 303 modules.
    WINAPI ISS_EnumIFHs
        IFHINFO *      pIFHRequestInfo
    ,   IFHINFO *      PIFHInfo
    ,   DWORD *        dwStructsize
    ,   DWORD *        pdwBytescopied
    ,   DWORD *        pdwstructCopied
  ISS_PutImageDisk: provides means for an application to "put" an image into a new or existing disk file.
  ISS_putImageDisplay: provides means for an application to place an image for display, referencing the image by its filename and memory location.

APPENDIX A-continued

ISS_PutImageMemory: provides means for an application to put an image into a memory buffer.
ISS_PutImagePrinter: provides means for an application to send an image to a printer via GDI 312.
   Sample computer executable code for image format conversion:

```
//--------------------------------------------------------------------------------
// Given an image of one image format, convert it to a different
image format.
//--------------------------------------------------------------------------------

HRESULT hresult = NOERROR;         // All Image Server modules
have a return type of HRESULT.
DWORD dwRefId = 0;                 // Image reference value as
                                   returned by
                                   // ISS_PutImageDisplay( ).
// Enumerate the IFHs so the File/SaveAs... filter list can be set up.
//
HRESULT hresult = NOERROR;
IFHINFO infoRequest;
IFHINFO * pInfo = NULL;
DWORD dwBytesCopied;
DWORD dwStructCopied;
// Find Out which IFHs are installed and display the file
extensions only for those formats.
//
memset( (VOID *) (&infoRequest), 0, sizeof(IFHINFO) );
infoRequest.bDefault = TRUE;
hresult = ISS_EnumIFHs( &infoRequest
                , NULL
                , 0
                , 0
                , &dwBytesCopied
                , &dwStructCopied
                );
if ( FAILED(hresult) && ( 0 == dwStructCopied ) )
{
   // Error - unable to enumerate IFHS.
}
// Allocate enough memory and get the list of installed IFHs.
//
pInfo = new IFHINFO[dwStructCopied];
hresult = ISS_EnumIFH5( &infoRequest
                , pInfo
                , sizeof(IFHINFO)
                , dwStructCopied
                , &dwBytesCopied
                , &dwStructCopied
                0;
// Copy the file extension fields from the array of returned
IFHINFO structures into a
// concatenated string.
TCHAR * pChar = pIFHFilter;
TCHAR pIFHFilter[256] = _T(" ");
for ( i = 0; i < dwStructCopied; i++ )
{
   _tcscpy( pChar, pInfo[i].szDescription );
   pChar += _tcslen( pInfo[i].szDescription );
   _tcscpy( pChar, _T("\0") );
   pChar += sizeof(TCSAR);
   _tcscpy( pChar, _T("*") );
   pChar += sizeof(TCHAR);
   _tcscpy( pChar. pInfo[i].szFileExtension ):
   pChar += _tcslen( pInfo[i].szFileExtension );
   _tcscpy( pChar, _T("\0") );
   pChar += sizeof(TCHAR);
}
_tcscpy( pChar, _T("\0") );
// Get the new filename.
//
OPENFILENAME ofn;
memset( (VOID *) (&ofn) , 0, sizeof(OPENFILENAME) );
ofn.lStructSize = sizeof(OPENFILENAME);
ofn.hwndOwner = hWnd;
ofn.lpstrFilter = pIFHFilter;
ofn.lpstrFile = new TCHAR[256];
ofn.nMaxFile = 256 * sizeof(TCHAR);
ofn.Flags =   OFN_OVERWRITEPROMPT;
if ( GetSaveFileName( (LPOPENFILENAME)&ofn ) )
```

APPENDIX A-continued

```
{
   hresult = ISS_ConvertFormat( IS_IMAGESOURCE_REFID
                , (VOID *)dwIRef
                , NULL
                , NULL
                , ofn.lpstrFile
                , & (pInfo[ofn.nFilterIndex-1].FomatType)
                , NULL
                );}delete ofn.lpstrFile; delete pInfo;
//--------------------------------------------------------------------------------
// Given an image of one image format, convert it to a different
image format. For this example, both the source image and destination
image are identified by filenane.
//--------------------------------------------------------------------------------
HRESULT hresult = NOERROR;   // All Image Server modules have a
return type of HRESULT.
TCHAR szFilenameSrc[ ] = _T("c:\\myfile.dib");
TCHAR szFilenameDest[ ] = _T("c:\\myfile.jpg");
hresult = ISS_ConvertFormat( IS_IMAGESOURCE_FILE
                , (VOID *)szFilenameSrc
                , NULL              // source format type
                , NULL              // custom ifh guid
                                    (source)
                , (VOID *)szFilenameDest
                , NULL              // dest format type
                , NULL              // Custom ifh guid
                                    (dest)
                );
```

What is claimed is:

1. A computer system for processing graphical images that can be stored in a plurality of file formats, comprising:
   a format independent interface (FII), wherein the FII communicates with an application program and routes image data and the application program commands; and
   a plurality of image format handling (IFH) modules, wherein each module can process format specific graphical image data and interface with the FII.

2. The system of claim 1, wherein the IFH modules can interface with the FII for receiving application program commands.

3. The system of claim 1, wherein the FII receives a request from the application program for a list of supported file formats.

4. The system of claim 3, wherein the FII queries a registry that contains a list of the plurality of modules that support the plurality of file formats; and sends a list of file formats to the FII.

5. The system of claim 1, wherein the application program sends a plurality of commands to FII to process a file.

6. The system of claim 5, wherein the command is to read a particular file stored in a specific file format.

7. The system of claim 6, wherein the file is in JPEG format.

8. The system of claim 6, wherein the file is in TIFF format.

9. The system of claim 6, wherein the file is in BMP format.

10. The system of claim 6, wherein the file is in an arbitrary format.

11. The system of claim 6, wherein the IFH module that can process the specified file format converts the file from the specified format to a device independent bitmap (DIB) image data.

12. The system of claim 11, wherein the IFH module that processes the specified file format sends the DIB image to the FII.

13. The system of claim 12, wherein the FII sends the DIB image data to a graphical device interface (GDI).

14. The system of claim 13, wherein the GDI sends the image data to a display device.

15. The system of claim 13, wherein the GDI sends the image data to a printer driver for processing.

16. The system of claim 5, wherein the FII sends the command to the plurality of IFH modules corresponding to the specified file format, for executing the command.

17. The system of claim 5, wherein the command is to save a particular file in a specified format.

18. The system of claim 17, wherein the application program sends the save command with the DIB image data to the FII.

19. The system of claim 18, wherein the FII sends the save command and the DIB image data to a IFH module that can process the specified format.

20. The system of claim 19, wherein the IFH module converts the DIB image data to the user specified file format.

21. A method for processing graphical images in a plurality of file formats, comprising the steps of:
    sending an application program request to a format independent interface (FII); and
    transmitting the application program request to a plurality of image format handling (IFH) modules that can process format specific graphic images.

22. The method of claim 21, wherein the application program request is to read a specific file stored in a specified format.

23. The method of claim 22, wherein the FII sends the read request to the IFH module that can process the specified format.

24. The method of claim 23, wherein the IFH module that can process the file format converts the image data from the file format to a device independent bitmap (DIB) data.

25. The method of claim 24, further comprising the steps of:
    transmitting the DIB image data to the FII, wherein the IFH module 20 that converts the stored file into DIB image data sends the DIB image data to the FII; and
    sending the DIB image data to a graphical device interface (GDI), wherein the FII sends the DIB image data to the GDI.

26. The method of claim 22, wherein the file is in JPEG format.

27. The method of claim 22, wherein the file is in BMP format.

28. The method of claim 22, wherein the file is in TIFF format.

29. The method of claim 22, wherein the file is PDF format.

30. The method of claim 22, wherein the file is in an arbitrary format.

31. The method of claim 21, wherein the application program command is to save an image file in a specific format.

32. The method of claim 31, wherein the application program sends the save command with DIB image data to FII.

33. The method of claim 32, wherein the FII sends the save command with the DIB image data to the IFH module that can process the specified format and save the file in the specified format.

34. A computer-readable medium storing computer-executable process steps for use in a computer system for processing graphical images in a plurality of file formats, the process steps comprising of:
    sending an application program request to a format independent interface (FII); and
    transmitting the application program request to a plurality of image format handling (IFH) modules that can process format specific graphic images.

35. Computer executable process steps of claim 34, wherein the application program request is to read a specific file stored in a specified format.

36. Computer executable process steps of claim 35, wherein the FII sends the read request to the IFH module that can process the specified format.

37. Computer executable process steps of claim 36, wherein the IFH module that can process the file format converts the image data from the stored file format to a device independent bitmap (DIB) data.

38. Computer executable process steps of claim 37, further comprising the process steps of:
    transmitting the DIB image data to the FII, wherein the IFH module that converts the stored file into DIB image data sends the DIB image data to the FII; and
    sending the DIB image data to a graphical device interface (GDI), wherein the FII sends the DIB image data to the GDI.

39. Computer executable process steps of claim 35, wherein the file is in JPEG format.

40. Computer executable process steps of claim 35, wherein the file is in BMP format.

41. Computer executable process steps of claim 35, wherein the file is in TIFF format.

42. Computer executable process steps of claim 35, wherein the file is PDF format.

43. Computer executable process steps of claim 35, wherein the file is in an arbitrary format.

44. Computer executable process steps of claim 34, wherein the application program command is to save an image file in a specific format.

45. Computer executable process steps of claim 44, wherein the application program sends the save command with DIB image data to FII.

46. Computer executable process steps of claim 45, wherein the FII sends the save command with the DIB image data to the IFH module that can process the specified format and save the file in the specified format.

* * * * *